United States Patent
Pollock et al.

(10) Patent No.: US 10,254,424 B1
(45) Date of Patent: Apr. 9, 2019

(54) ACOUSTIC PARTICLES AND METAMATERIALS FOR USE AS LOCALIZATION AND CONTRAST AGENTS

(71) Applicant: Oceanit Laboratories, Inc., Honolulu, HI (US)

(72) Inventors: Jacob Freas Pollock, Honolulu, HI (US); Vinod P. Veedu, Houston, TX (US); Christopher J. Sullivan, Honolulu, HI (US); Glen Nakafuji, Honolulu, HI (US)

(73) Assignee: Oceanit Laboratories, Inc., Honolulu, HI (US)

( * ) Notice: Subject to any disclaimer, the term of this patent is extended or adjusted under 35 U.S.C. 154(b) by 160 days.

(21) Appl. No.: 14/679,344

(22) Filed: Apr. 6, 2015

Related U.S. Application Data

(60) Provisional application No. 61/975,389, filed on Apr. 4, 2014.

(51) Int. Cl.
　　*G01V 1/52*　　(2006.01)
　　*E21B 43/267*　　(2006.01)

(52) U.S. Cl.
　　CPC .............. *G01V 1/52* (2013.01); *E21B 43/267* (2013.01)

(58) Field of Classification Search
　　CPC .......... G01V 1/52; E21B 43/26; E21B 43/267
　　See application file for complete search history.

(56) References Cited

U.S. PATENT DOCUMENTS

| | | | | |
|---|---|---|---|---|
| 4,716,556 A | * | 12/1987 | Raskin | G01V 1/201 310/26 |
| 8,168,570 B2 | * | 5/2012 | Barron | B01J 13/02 428/357 |
| 9,803,135 B2 | * | 10/2017 | Barron | C09K 8/80 |
| 2002/0114928 A1 | * | 8/2002 | Sheng | B29C 70/60 428/195.1 |
| 2004/0226715 A1 | * | 11/2004 | Willberg | E21B 47/00 166/250.1 |
| 2006/0052251 A1 | * | 3/2006 | Anderson | C09K 8/03 507/103 |
| 2009/0087912 A1 | * | 4/2009 | Ramos | C09K 8/032 436/27 |
| 2009/0288820 A1 | * | 11/2009 | Barron | B01J 13/02 166/249 |
| 2011/0011576 A1 | * | 1/2011 | Cavender | E21B 33/13 166/177.1 |
| 2012/0181020 A1 | * | 7/2012 | Barron | B01J 13/02 166/250.1 |
| 2013/0133979 A1 | * | 5/2013 | Sheng | G10K 11/172 181/294 |
| 2014/0239957 A1 | * | 8/2014 | Zhang | G01V 3/30 324/334 |

(Continued)

*Primary Examiner* — Zakiya W Bates
*Assistant Examiner* — Crystal J Miller
(74) *Attorney, Agent, or Firm* — James Creighton Wray; Meera P. Narasimhan

(57) ABSTRACT

Acoustic particle metamaterials in Smart Proppants reflect sound waves at distinct frequency ranges when receiving sounds from an above ground or in-ground source. Sound receivers at separated locations receive the reflected sound waves at distinct times, providing information on location of the Smart Proppants, which are mixed with conventional proppants. The Smart Proppants prevent transmission of waves at precise ranges of frequencies and reflect those waves.

7 Claims, 13 Drawing Sheets

Foam-like locally resonant particle structure.

(56) References Cited

U.S. PATENT DOCUMENTS

| | | | | |
|---|---|---|---|---|
| 2014/0371353 A1* | 12/2014 | Mitchell | ............... | C04B 28/02 |
| | | | | 524/5 |
| 2015/0167459 A1* | 6/2015 | Sen | ............... | G01V 3/30 |
| | | | | 166/254.1 |
| 2015/0354337 A1* | 12/2015 | Ersoz | ............... | E21B 47/00 |
| | | | | 166/250.1 |
| 2017/0260843 A1* | 9/2017 | Ersoz | ............... | E21B 47/00 |

* cited by examiner

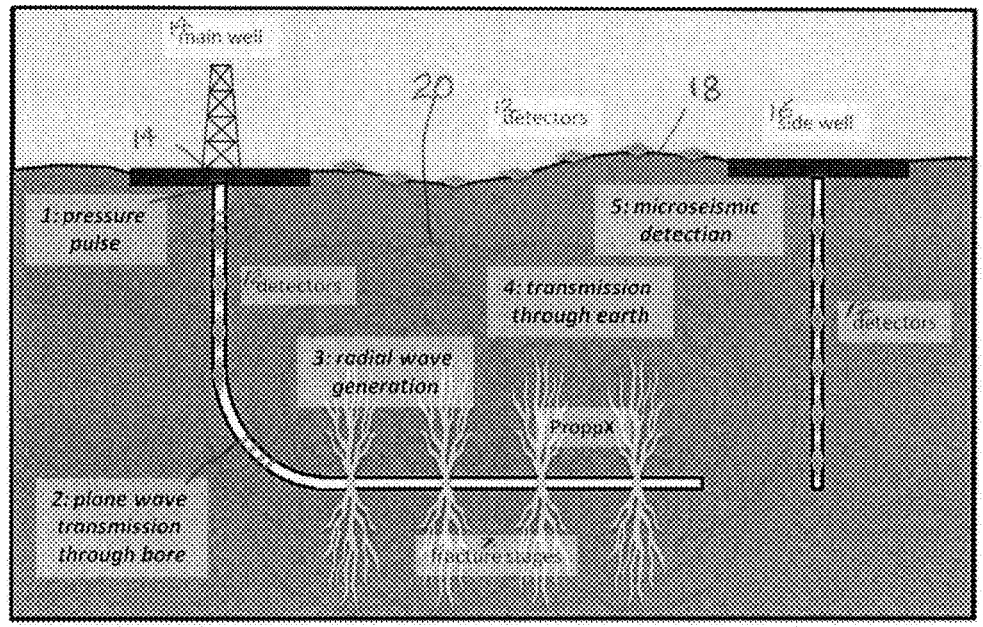
Figure 1: Example of utilizing smart proppant to map hydraulic fracture location and characteristics.
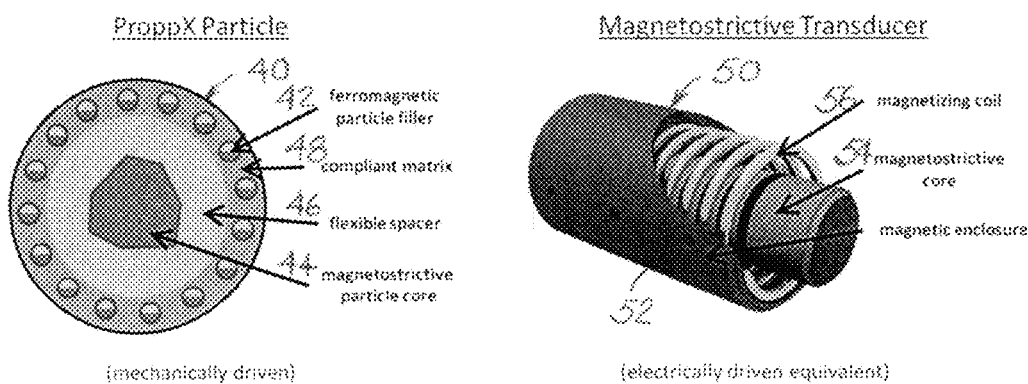
Figure 2: Example of smart proppant structure along with the structure of conventional magnetostrictive transducer (electrical equivalent of mechanically driven system).

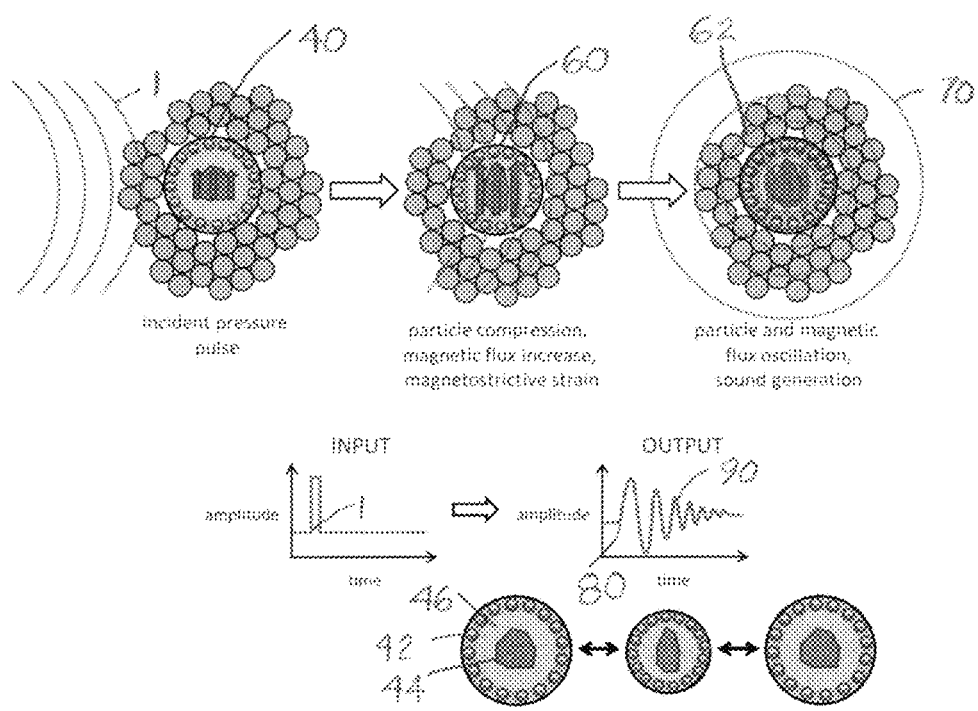
Figure 3: Mechanism of stimulation of smart proppant particles.

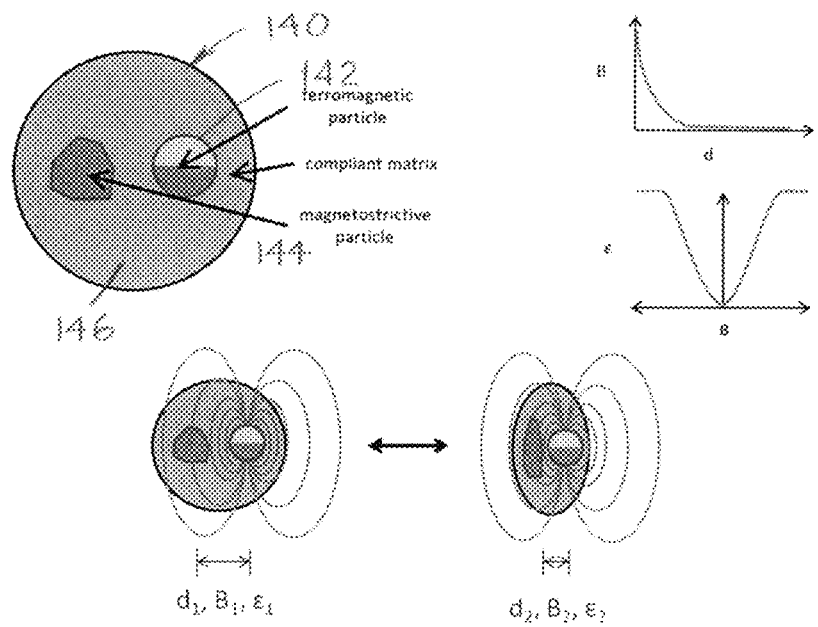
Figure 4: Simplified composite structure of smart proppant particle and mode of activation.
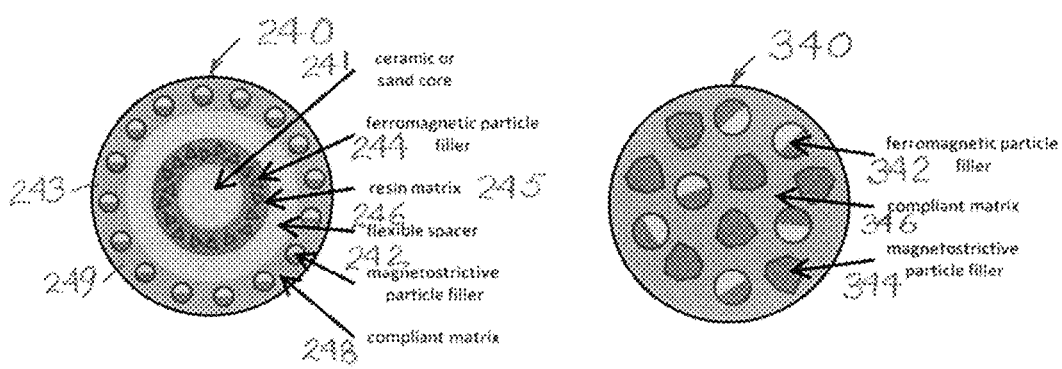
Figure 5: Examples of composite structure for smart proppant particle.

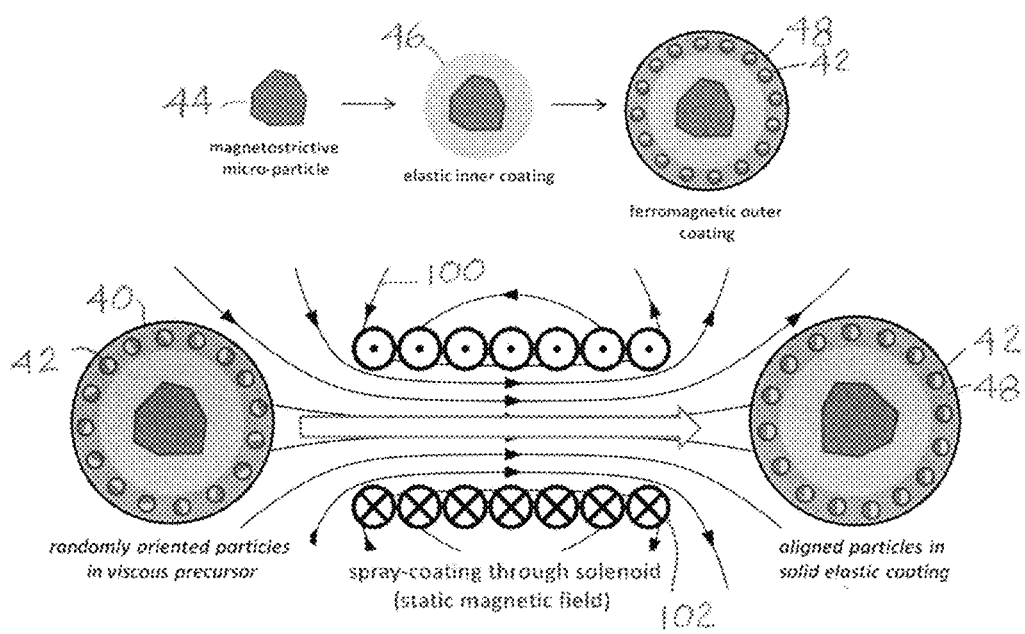
Figure 6: Examples of smart proppant production methods.
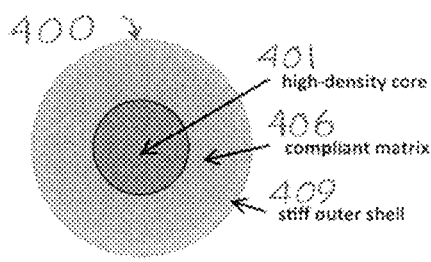
Figure 7: Layered locally resonant particle structure.

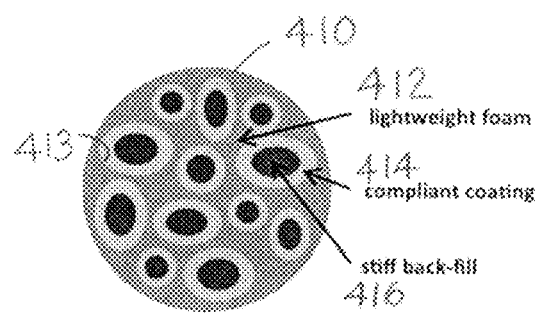
Figure 8: Foam-like locally resonant particle structure.
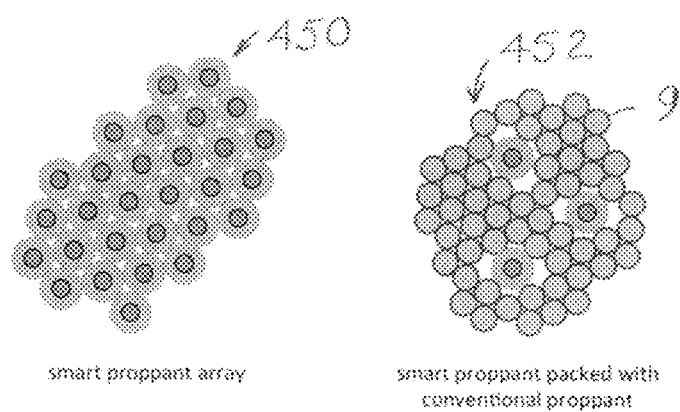
Figure 9: Acoustic band-gap smart proppant in an array of itself (left) and in a pack with conventional proppant (right).

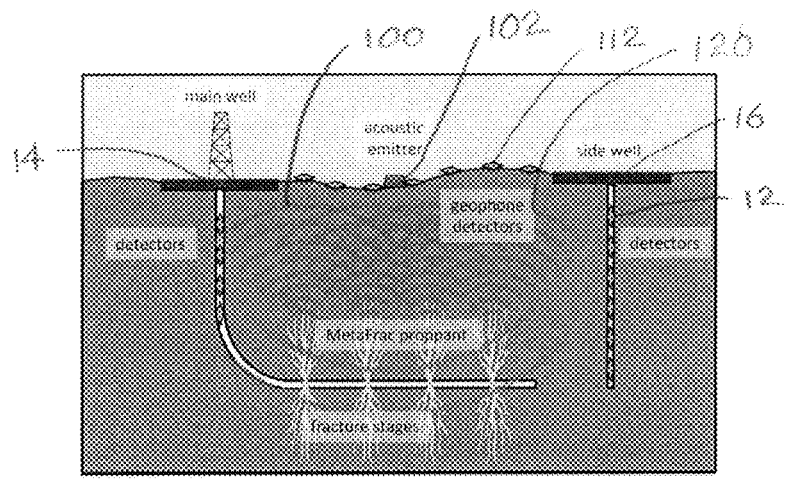
Figure 10: Mapping of Oceanit MetaFrac smart proppant within hydraulic fractures using reflection seismology.
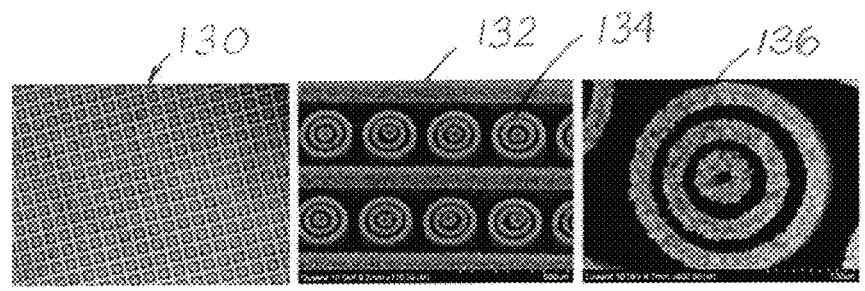
Figure 11: Acoustic metamaterial developed at Oceanit composed of vertically aligned carbon nanotubes, shown at increasing magnification.

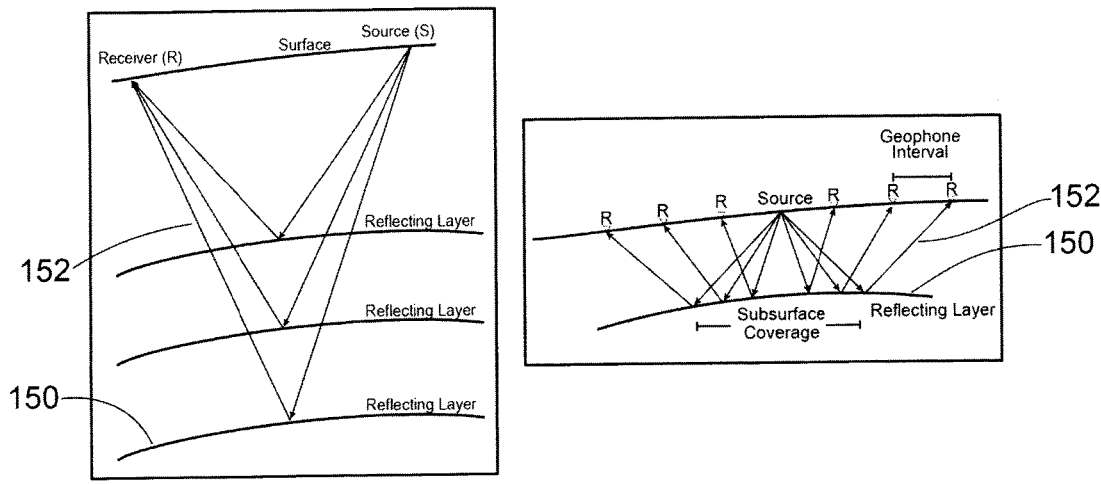
Figure 12: Schematic of surface reflection seismic methods.
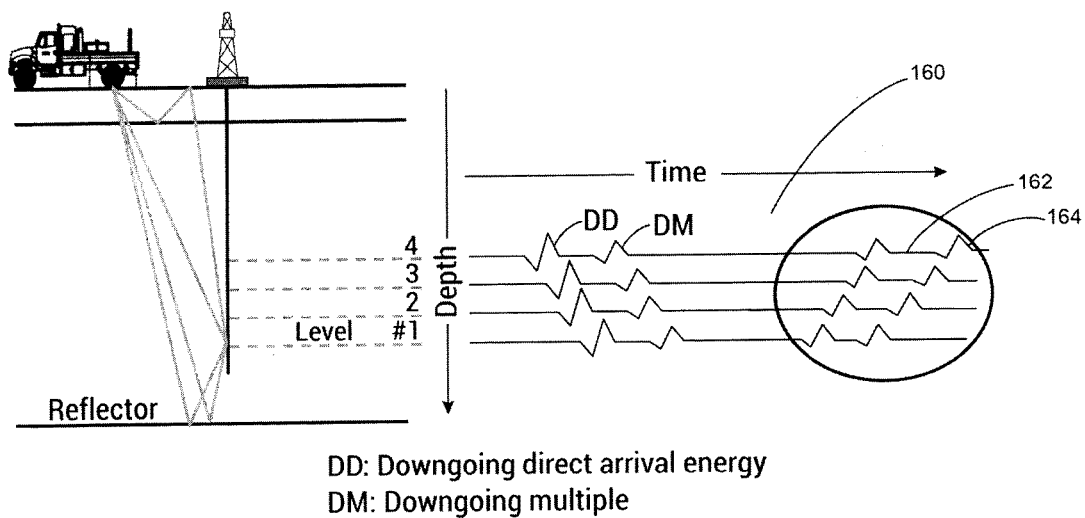
DD: Downgoing direct arrival energy
DM: Downgoing multiple
Figure 13: The total wavefield recorded by geophones in a well. The upgoing P-wave and converted S-wave reflections provide the most information about the subsurface. (Schlumberger)

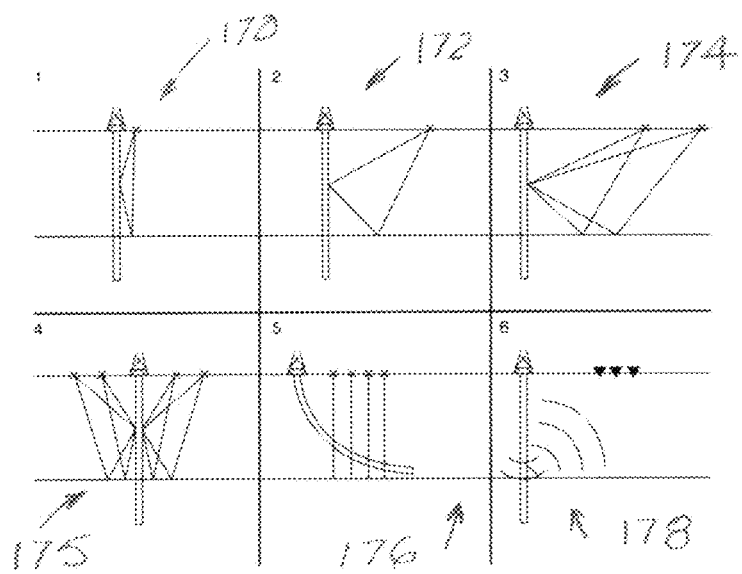
Figure 14: Common acquisition geometries for vertical seismic profiling (VSP): (1) zero-offset VSP (ZVSP), (2) offset VSP, (3) multi-offset VSP, (4) walk-away VSP, (5) walk-above VSP, and (6) drill-bit SWD (seismic while drilling) VSP.

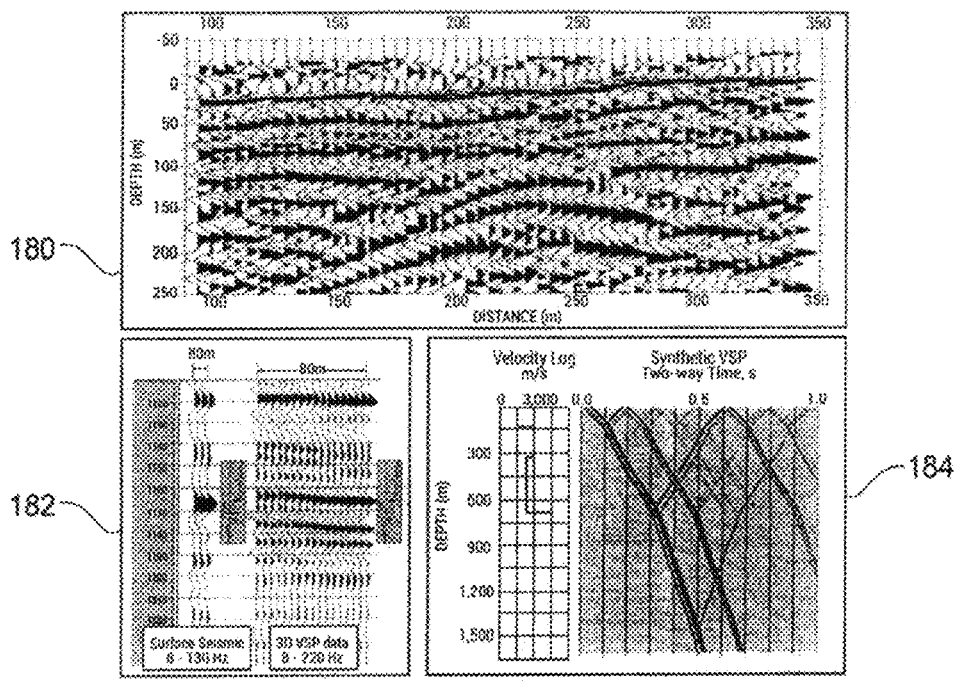

Figure 15: Examples of reflection seismology recordings from surface seismic and vertical seismic profiling.

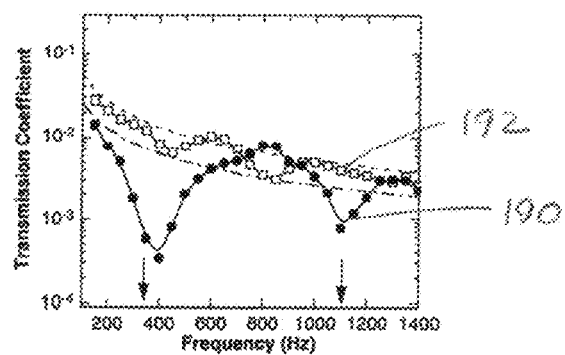

Figure 16: Measured amplitude transmission through a 2.1-cm slab of composite material containing 48 volume % of randomly dispersed silicone rubber coated lead spheres in an epoxy matrix (solid circles. As a reference, the measured amplitude transmission through a 2.1-cm slab of epoxy is also plotted (open squares). (Liu, Science 2000)

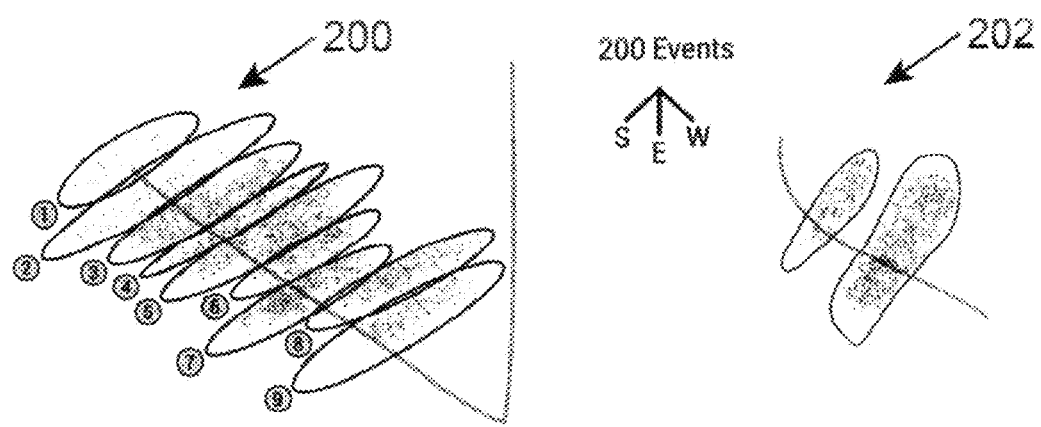
Figure 17: Examples of microseismic fracture maps.

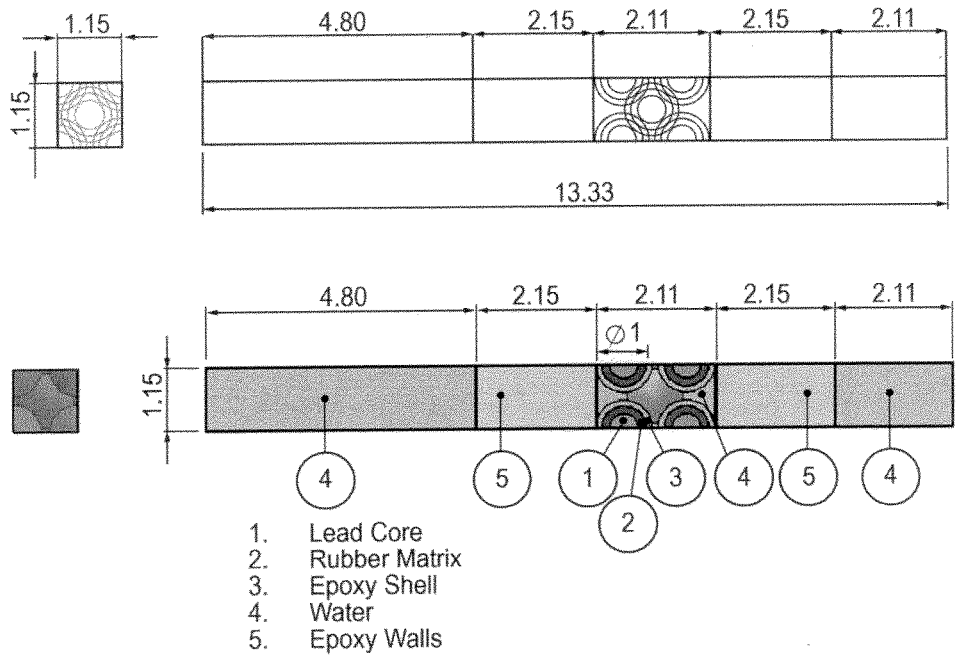

1. Lead Core
2. Rubber Matrix
3. Epoxy Shell
4. Water
5. Epoxy Walls

Figure 18: Unit cell model and simulated impedance tube for determining smart proppant acoustic response.

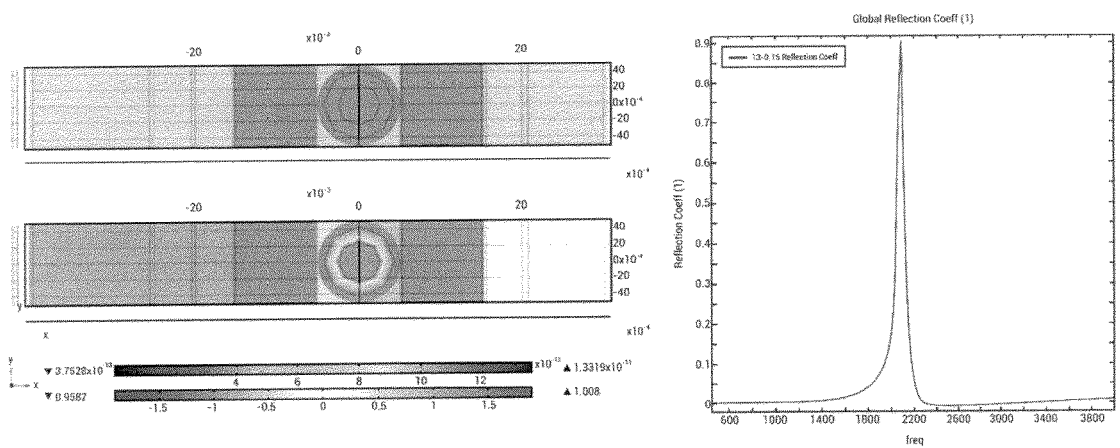

Figure 19: Smart proppant displacement and acoustic pressures at non-resonance frequencies (top) and at the local resonance frequency (bottom), indicating core activation and total reflection. Right: Reflection coefficient as a function of frequency, demonstrating increase in reflection from close to zero to nearly one.

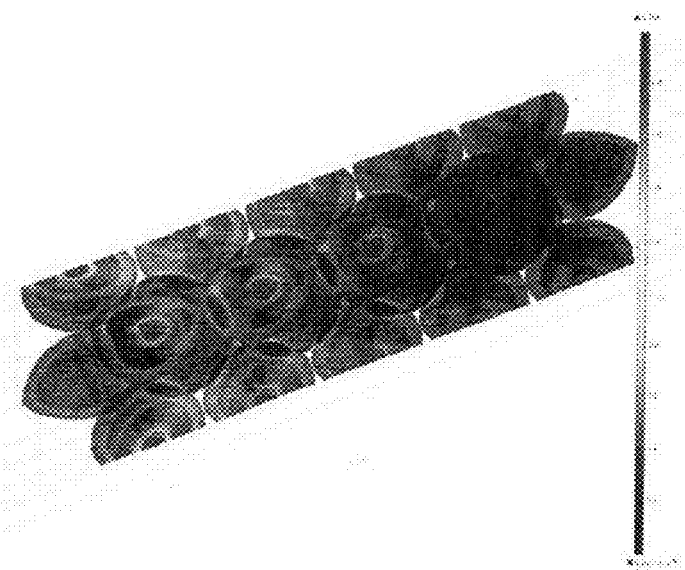
Figure 20
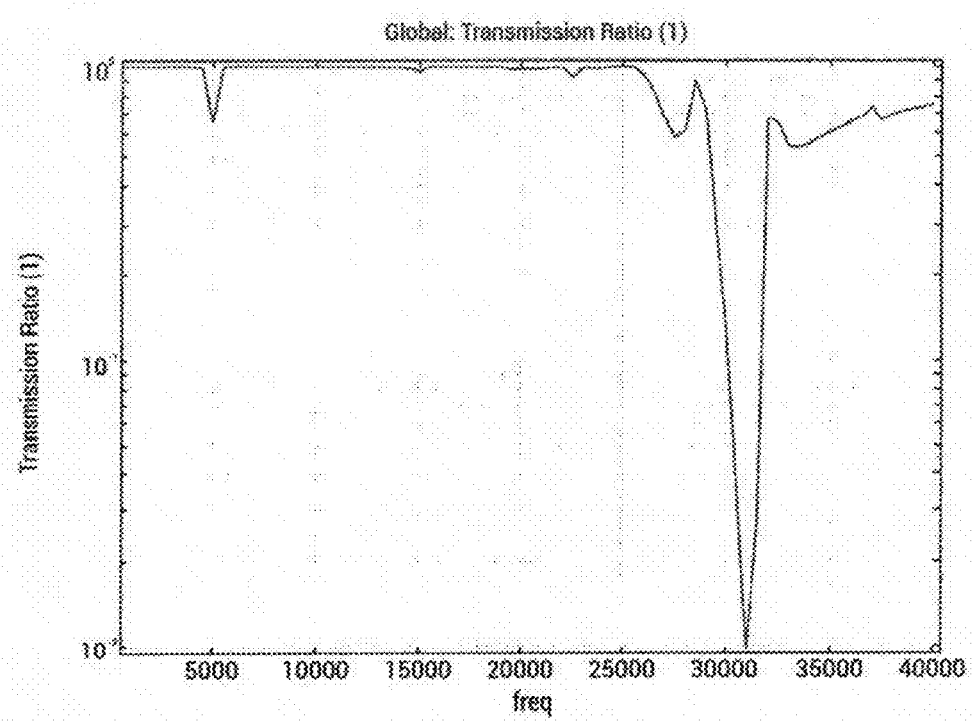
Figure 21: Transmission ratio as a function of frequency for 0.5 mm diameter particles for a 10 particle deep array. This corresponds to a 30 dB loss from a source of 90 dB.

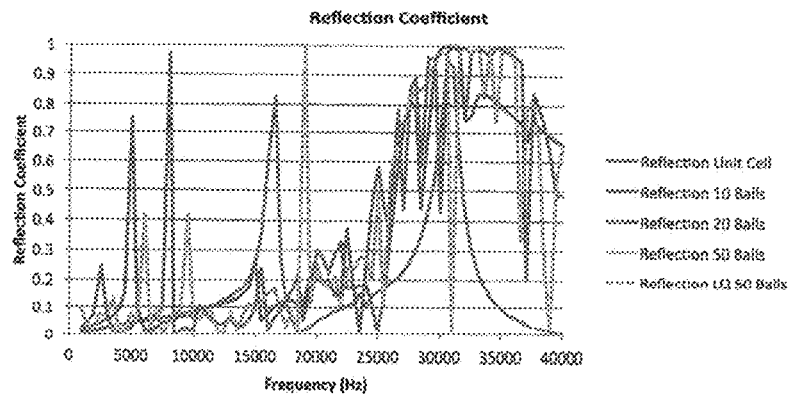
Figure 22
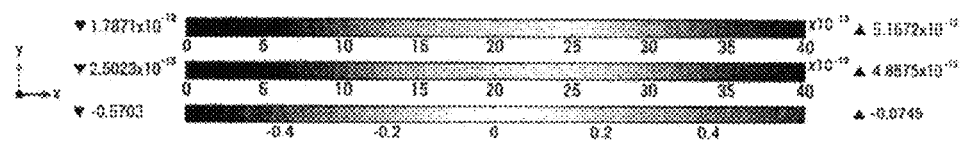
Figure 23: Transient pulse analysis of unit cell array model demonstrating local resonance and reflection with a pulse at the local resonance frequency (top) and propagation and transmission at other frequencies (bottom).

ACOUSTIC PARTICLES AND METAMATERIALS FOR USE AS LOCALIZATION AND CONTRAST AGENTS

This application claims the benefit of U.S. Provisional Application No. 61/975,389 filed Apr. 4, 2014, which is hereby incorporated by reference in its entirety as if fully set forth herein.

SUMMARY OF THE INVENTION

The invention provides compositions, methods of production, and methods of use of composite particles that can be detected at a distance using acoustic stimulation. The particle can be used as a proppant or in conjunction with another proppant to map hydraulic fracture location and environmental conditions such as closure stress and product flow rate.

In some embodiments, an acoustic metamaterial is used to localize and map hydraulic fractures. For example, metamaterials exhibiting acoustic band gap behavior can be used to alter the sonic transmission and reflection characteristics within a fault or fracture in order to determine the distribution of the material. Multi-layer or composite particles can be produced that exhibit a local resonance at wavelengths much larger than the characteristic dimensions of the particle. The structural mechanics of the particle preclude certain frequencies from being transmitted, exhibiting a negative elastic constant and acting as a total wave reflector within a range of frequencies.

These particles can be composed of a solid, high-density core (e.g. steel or lead) within an elastic layer (e.g. silicone or polyurethane) further coated with a lightweight, stiff outer shell (e.g. resin or ceramic). Such particles can be produced by a variety of coating methods, including film forming, molding, and/or emulsion polymerization. In an alternative embodiment, the particles are composed of a stiff, lightweight foam (e.g. aluminum) coated and back-filled with materials of different elastic modulus. For example a layer of soft elastomer (e.g. soft polyurethane) can be applied to the foam surface within the pores by back-filling the foam with a liquid precursor followed by flowing gas through the foam to force out excess material. After curing the first layer, a second, harder material (e.g. hard elastomer, resin, or ceramic) is injected into the pores, producing a solid structure. In alternative embodiments, the second pore-filling material is injected before the first is completely cured, displacing some of it. The metamaterials may be produced as individual particles or as a bulk material that is divided or broken into smaller pieces. The acoustic properties of the particles can be tuned as a function of its composite structure and the material properties of the components. Such particles may be used as proppant by themselves or in conjunction with conventional proppant. Due to the non-linear mechanical behavior of such particles, they exhibit specific acoustic behavior dependent upon the fracture closure stress. Frequency shifts at the reflected frequencies indicate a Doppler shift due to fluid flow.

In this case, a sonic emitter can be positioned within the well bore or at the Earth surface. The emitter can produce a vibrational pulse, acoustic noise, or a particular pressure signal function that is then detected either at the source or on the opposite side of the area of interest by an array of detectors. Reflection coefficient as a function of distance or depth can be measured at particular frequencies to locate areas with high reflection or low transmission within the range of the band gap of the metamaterial particles. A directional sound source and detector can alternatively be used to scan an area in order to map the distribution of the particles.

Oceanit's new class of smart proppants acts as environmentally sensitive acoustic contrast agents for determining proppant distribution and local mechanical conditions within hydraulic fractures. The smart proppant particles alter the acoustic characteristics of the fracture, increasing reflections at specific frequencies. This contrast in acoustic reflection can be measured using reflection seismology. The new smart proppant, together with available and novel acoustic probing and detection methods, provide a large amount of additional data that can be used to improve well management and long-term productivity. Mapping of Oceanit smart proppant within hydraulic fractures uses currently used as well as novel acoustic interrogation techniques.

The new metamaterials have structures that cause them to interact with wavelengths much larger than their feature size. They are typically composed of repeating, but not necessarily ordered, sub-structures and have bulk characteristics not seen in their constituent materials and which may not be found in nature, including negative material properties such as elastic modulus. Acoustic metamaterials alter sonic transmission within a certain range of frequencies and amplitudes, allowing them to act as acoustic band gap and amplitude-dependent filters. Oceanit harnesses its experience in designing, fabricating, and characterizing nanomaterials as acoustic filters for passive hearing protection in its development of novel smart proppant particles to act as acoustic contrast agents for locating and analyzing hydraulic fractures. Some new acoustic metamaterial developed at Oceanit are composed of vertically aligned carbon nanotubes.

Acoustic techniques for measuring geological and well characteristics are usable in multiple phases of well development to aid in planning and operation. Smart proppant technology used with these same techniques complements information about formation properties with measurements of proppant distribution and local stresses. Surface reflection seismology utilizes a sound source or sources and a geophone or an array of geophones spaced across the surface in order to measure time-delays caused by acoustic reflection at different depths within the formation. Vertical seismic profiling increases the resolution of such measurements by positioning receivers and/or sources within the borehole or below the surface.

Surface reflection seismic methods are used. The total wavefield is recorded by geophones in a well. The upgoing P-wave and converted S-wave reflections provide the most information about the subsurface. Acquisition geometries are used for vertical seismic profiling (VSP): (1) zero-offset VSP (ZVSP), (2) offset VSP, (3) multi-offset VSP, (4) walk-away VSP, (5) walk-above VSP, and (6) drill-bit SWD (seismic while drilling) VSP. Reflection seismology recordings from surface seismic and vertical seismic profiling are employed.

Metamaterials exhibiting acoustic band gap behavior can be used to alter the sonic transmission and reflection characteristics within a fault or fracture in order to determine the distribution of the material. Multi-layer or composite particles can be produced that exhibit a local resonance at wavelengths much larger than the characteristic dimensions of the particle. The structural mechanics of the particle preclude certain frequencies from being transmitted, exhibiting a negative elastic constant and acting as a total wave reflector within a range of frequencies.

Amplitude transmission may be measured through a 2.1-cm slab of composite material containing 48 volume % of randomly dispersed silicone rubber coated lead spheres in an epoxy matrix. As a reference, the measured amplitude transmission through a 2.1-cm slab of epoxy is also plotted.

One advantage of Oceanit's metamaterial approach is that the smart proppant transmits acoustic signals at some frequencies and reflects them at others. This allows mapping of geological formation features around the fractures at one frequency and the proppant location and fracture mechanics at another. This information can be combined with microseismic data to further evaluate proppant placement within and among fractures. Microseismic fracture maps are produced.

The smart proppant exhibits a stress-dependent acoustic response due to the non-linear mechanical nature of surface contact between the spherical particles. Frequency changes in reflected signals result from Doppler shifts due to fluid flow through the particles in the fracture. Therefore, in addition to use of time-delay for localization, information on amplitude and frequency response can be used to map local mechanical environment.

Interrogation methods for the smart proppant range from seismic to ultrasonic. Various sources can be used, including explosives, air guns, vebroseism, impacts, and piezos. Detectors can be arranged in any configuration to obtain a useful signal. The spacing from the source(s) and each other may range from centimeters to kilometers. The detector may be part of a downhole tool and sources may be monopole, dipole, or quadripole. Stimulation and detection may also be full-wave sonic methods. Through proper spectral analysis, stress levels and anisotropy can be determined. Local interrogation of proppant within fractures may also be accomplished by probing fractures directly.

These and further and other objects and features of the invention are apparent in the disclosure, which includes the above and ongoing written specification, with the claims and the drawings.

BRIEF DESCRIPTION OF THE DRAWINGS

FIG. 1 shows a unit cell model and simulated impedance tube.

FIG. 2 illustrates smart proppant response to acoustic stimulation.

FIG. 3 shows stress distribution at the local resonance frequency.

FIG. 4 is a plot of transmission ratio versus frequency for demonstrating acoustic band gap behavior.

FIG. 5 is a plot of reflection coefficient versus frequency for various lattice depths and proppant combinations.

FIG. 6 shows transient acoustic pulse behavior for the smart proppant.

FIG. 7 shows a layered locally resonant particle structure.

FIG. 8 shows a foam-like locally resonant particle structure.

FIG. 9 shows an acoustic band-gap smart proppant in an array of itself (left) and in a pack with conventional proppant (right).

FIG. 10 shows mapping of Oceanit MetaFrac smart proppant within hydraulic fractures using reflection seismology.

FIG. 11 shows acoustic metamaterial developed at Oceanit composed of vertically aligned carbon nanotubes shown at increasing magnification.

FIG. 12 is a schematic representation of surface reflection seismic methods FIG. 13 shows the total wavefield recorded by geophones in a well.

FIG. 14 shows common acquisition geometries for vertical seismic profiling (VSP): zero-offset VSP (ZVSP), offset VSP, multi-offset VSP, walk-away VSP, walk-above VSP, and drill-bit SWD (seismic while drilling) VSP.

FIG. 15 shows examples of reflection seismology recordings from surface seismic and vertical seismic profiling.

FIG. 16 shows measured amplitude transmission through a 2.1-cm slab of composite material containing 48 volume % of randomly dispersed silicone rubber coated lead spheres in an epoxy matrix solid circles.

FIG. 17 shows examples of microseismic fracture maps.

FIG. 18 shows a unit cell model and simulated impedance tube for determining smart proppant acoustic response.

FIG. 19 shows smart proppant displacement and acoustic pressures at non-resonance frequencies (top) and at the local resonance frequency (bottom), indicating core activation and total reflection. Right: Reflection coefficient as a function of frequency, demonstrating increase in reflection from close to zero to nearly one.

FIG. 20 shows Von Mises stress in an array of smart proppant particles at the local resonance frequency, indicating local stress at the interface of the matrix and core.

FIG. 21 shows transmission ratio as a function of frequency for 0.5 mm diameter particles for a 10 particle deep array. This corresponds to a 30 dB loss from a source of 90 dB.

FIG. 22 shows the effect of lattice depth on reflection coefficient for smart proppant and the reflection coefficient for a mixture of smart proppant and traditional proppant (dotted line). The mixture showed the same acoustic reflection response as smart proppant alone, while traditional proppant alone did not show a local resonance response (not shown).

FIG. 23 shows transient pulse analysis of unit cell array model demonstrating local resonance and reflection with a pulse at the local resonance frequency (top) and propagation and transmission at other frequencies (bottom).

DETAILED DESCRIPTION OF THE INVENTION

As previously discussed, composite particles can be detected at a distance using acoustic stimulation. The particle can be used as a proppant or in conjunction with another proppant to map hydraulic fracture location and environmental conditions such as closure stress and product flow rate.

In one embodiment as shown in FIG. 1, the particle effectively acts to scatter vibrations and can convert an incident pressure pulse 1 or broadband noise signal to radial transmission 20 at a particular frequency or frequencies. In this way, an input signal 1, such as a plane pressure wave 2 transmission through a bore 6 and fracture stages 7 from a pulse or pulse train, can be converted to an output signal 3 that radiates 20 from the geometric distribution of the particles and microseismic detection 5 can be detected by detectors 12 in well 14 and side wells 16 and on or in the ground 18 to determine their locations of the particles 40. The distribution can be triangulated, for example, using the time delay of the acoustic signals. Furthermore, the response of each particle is dependent upon its mechanical environment, with signal strength decreasing with increased stress and frequency shifting based compressive strain. Environmental parameters such as flow rate can further be deduced from further frequency shifts. In this way, the local mechanical environment can also be mapped.

The particles 40 of the invention, in one embodiment as shown in FIG. 2, are composed of smaller ferromagnetic 42 and magnetostrictive 44 particles that are separated by a flexible spacer 46 and are arranged in a manner such that under compression the sub-particles 42 and 44 become closer together and the magnetostrictive particles 44 experience increased magnetic flux and undergo additional deformation, as shown in FIG. 2, much like a magnetic transducer 50 with a magnetic enclosure 52, a magnetostrictive core 54 and a magnetizing coil 56.

Vibration of the particles of the invention 40 caused by an incident pressure pulse 1 and particle compression 60 results in an oscillating magnetic field at the position of the magnetostrictive particles 40 inducing significant oscillation 62 of strain and producing sound 70 similar to a point source 80 as shown in FIG. 3. The natural vibration frequency 90 of the particle 40 influences the frequency of sound 70 produced. The ferromagnetic 42 and magnetostrictive 44 particles are separated by an elastic matrix 46 that allows for deformation under the desired mechanical conditions.

In another embodiment, the particles 140 consist of one ferromagnetic particle 142 and one magnetostrictive particle 144 at a particular spacing within an elastic matrix 146 shown in FIG. 4.

Particles 140 can be produced by micro-molding or spray drying a composite precursor of an elastomer (e.g. polyurethane) or ceramic (e.g. bauxite) at the proper proportions. In an embodiment shown in FIG. 2, a magnetostrictive core 44 is coated with an elastic spacer 46 layer followed by a compliant matrix layer 48 filled with ferromagnetic particles 42. These can be produced by spray drying magnetostrictive particles 44 with an elastomer or ceramic coating 48 and again spray drying with a compliant matrix 48 containing ferromagnetic particles 42.

In another embodiment as shown in FIG. 5, the particle 240 is composed of an inorganic core 241, such as sorted sand or ceramic micro-particles, coated with a magnetostrictive polymer composite 243 composed of a resin 245 and magnetostrictive micro-particles 244, which is then coated with an elastic spacer layer 246, and finally coated with a ferromagnetic composite 249 composed of an elastic matrix 248 containing ferromagnetic micro- or nano-particles 242. These particles 240 can be similarly produced by sequential spray drying techniques. In alternative embodiments, the arrangement of the ferromagnetic and magnetostrictive sub-particles is exchanged such that ferromagnetic sub-particles are at the core. In another embodiment shown in FIG. 5, the particles 340 consist of micro- or nano-particles of ferromagnetic 342 and magnetostrictive 344 material distributed throughout an elastic matrix 346. The composition of such particles 340 is dictated by the relative proportions of the constitutive components. They can be produced by micro-molding, spray drying, or grinding of a continuous composite material produced by conventional mixing and molding.

The magnetic sub-particles 42 may be aligned during production by passing them through a static magnetic field 100 shown in FIG. 6. For example, precursor particles or solution can be spray-dried through a solenoid 102 producing a magnetic field 100. Furthermore, a furnace may be used in conjunction with the solenoid 102, such as for particle drying or curing. The sub-particles 42 become aligned in the magnetic field and locked into place by setting of the matrix 48 around them. Once the external field 100 is removed, the sub-particles maintain their alignment, reinforcing the magnetic field within the particle.

In one application, as shown in FIG. 1, the particles 40, 140, 240, 340 of the invention are placed into hydraulic fractures 7 during proppant 9 injection and are secured in place by fracture closure stresses. The particles are stimulated either by an external signal 1 sent down the well-bore 14 or into the fractures 7 or by the background noise present due to pumping or natural geological vibrations. The resulting signal 3 is then received by an array of geophone detectors 12 distributed around the fractures 7. These detectors 12 may be in the main well 14, in a side well 6, and/or on the earth's 18 surface above the fracture. A pressure wave 2 created by an impulse 1 can be used to stimulate the particles 40, 140, 240, 340 from the well head or from a down-hole location closer to the fractures. A square wave pressure signal is also useful for stimulating the particles, but any modulated or pulsed input signal can be used.

In some embodiments, an acoustic metamaterial 400 is used to localize and map hydraulic fractures 7. For example, metamaterials 400 exhibiting acoustic band gap behavior can be used to alter the sonic transmission and reflection characteristics within a fault or fracture in order to determine the distribution of the material. Multi-layer or composite particles can be produced that exhibit a local resonance at wavelengths much larger than the characteristic dimensions of the particle. The structural mechanics of the particle preclude certain frequencies from being transmitted, exhibiting a negative elastic constant and acting as a total wave reflector within a range of frequencies.

These particles 400, as shown in FIG. 7, can be composed of a solid, high-density core 401 (e.g. steel or lead) within an elastic layer 406 (e.g. silicone or polyurethane) further coated with a lightweight, stiff outer shell 409, e.g. made of resin or ceramic. Such particles 400 can be produced by a variety of coating methods, including film forming, molding, and/or emulsion polymerization.

In an alternative embodiment, as shown in FIG. 8, the particles 410 are composed of a stiff, lightweight foam 412 (e.g. aluminum) coated and back-filled with materials of different elastic modulus. For example, a layer of soft elastomer 414 (e.g. soft polyurethane) can be applied to the foam surface 413 within the pores by back-filling the foam with a liquid precursor followed by flowing gas through the foam to force out excess material. After curing the first layer 4, a second, harder material 416 (e.g. hard elastomer, resin, or ceramic) is injected into the pores, producing a solid structure. In alternative embodiments, the second pore-filling material is injected before the first is completely cured, displacing some of it. The metamaterials may be produced as individual particles or as a bulk material that is divided or broken into smaller pieces. The acoustic properties of the particles can be tuned as a function of its composite structure and the material properties of the components.

Such particles 40, 140, 240, 340, 400 may be used as proppant 450 by themselves 420 or in conjunction 452 with conventional proppant 9, as shown in FIG. 9. Due to the non-linear mechanical behavior of such particles, they exhibit specific acoustic behavior dependent upon the fracture closure stress. Frequency shifts at the reflected frequencies indicate a Doppler shift due to fluid flow.

In this case, a sonic emitter can be positioned within the well bore or at the Earth surface. The emitter can produce a vibrational pulse 1, acoustic noise, or a particular pressure signal function that is then detected either at the source or on the opposite side of the area of interest by an array of detectors 12. Reflection coefficient as a function of distance or depth can be measured at particular frequencies to locate areas with high reflection or low transmission within the range of the band gap of the metamaterial particles. A directional sound source and detector can alternatively be used to scan an area in order to map the distribution of the particles.

Oceanit's new class of smart proppants act as environmentally sensitive acoustic contrast agents for determining proppant distribution and local mechanical conditions within hydraulic fractures. The smart proppant particles alter the acoustic characteristics of the fracture, increasing reflections at specific frequencies. This contrast in acoustic reflection can be measured using reflection seismology 100, as shown in FIG. 10. An acoustic emitter 102 and geophone detectors 112 may be mounted on the ground and used with detectors 12 in wells 14 and 16. The new "MetaFrac" smart proppant, together with available seismic probing and detection methods, provide a large amount of additional data that can be used to improve well management and long-term productivity. FIG. 10 shows mapping of Oceanit MetaFrac smart proppant within hydraulic fractures using reflection seismology 100.

Metamaterials 130 have structures 132 that cause them to interact with wavelengths much larger than their feature size. Acoustic metamaterial 130 developed at Oceanit composed of vertically aligned carbon nanotubes 136 are shown at increasing magnification in FIG. 11. They are typically composed of repeating sub-structures 134 and have bulk characteristics not seen in their constituent materials and which may not be found in nature, including negative material properties such as refractive index or elastic modulus. Acoustic metamaterials alter sonic transmission within a certain range of frequencies and amplitudes, allowing them to act as acoustic band gap and amplitude-dependent filters. Oceanit harnesses its experience in designing, fabricating, and characterizing nano-materials as acoustic filters for passive hearing protection in its development of novel MetaFrac smart proppant particles 40, 120 to act as acoustic contrast agents for locating and analyzing hydraulic fractures.

Seismic techniques for measuring geological characteristics are used in multiple phases of well development to aid in planning and operation. MetaFrac technology is usable with these same techniques to complement information about formation properties with measurements of proppant distribution and local stresses. Surface reflection seismology 100 utilizes a sound source 102 or sources and a geophone or an array of geophones 112 spaced across the surface in order to measure time-delays caused by acoustic reflection 120 at different depths within the formation, as shown in FIG. 12. Vertical seismic profiling increases the resolution of such measurements by positioning receivers 12 and/or sources 1 within the borehole 14 or below the surface, as shown in FIGS. 13-15.

FIG. 12 is a schematic representation of surface 150 reflection 152 seismic methods.

FIG. 13 shows the total wavefield 160 recorded by geophones in a well. The upgoing P-wave 162 and converted S-wave 164 reflections provide the most information about the subsurface.

FIG. 14 shows common acquisition geometries for vertical seismic profiling (VSP): zero-offset VSP (ZVSP) 170, offset VSP 172, multi-offset VSP 174, walk-away VSP 175, walk-above VSP 176, and drill-bit SWD (seismic while drilling) VSP 178.

FIG. 15 shows examples of reflection seismology recordings 180 from surface seismic 182 and vertical seismic profiling 184.

FIG. 16 shows measured amplitude transmission through a 2.1-cm slab of composite material containing 48 volume % of randomly dispersed silicone rubber coated lead spheres 190 in an epoxy matrix solid circles. As a reference, the measured amplitude transmission through a 2.1-cm slab of epoxy is also plotted (open squares 192).

Metamaterials exhibiting acoustic band gap behavior can be used to alter the sonic transmission and reflection characteristics within a fault or fracture in order to determine the distribution of the material. Multi-layer or composite particles can be produced that exhibit a local resonance at wavelengths much larger than the characteristic dimensions of the particle. The structural mechanics of the particle preclude certain frequencies from being transmitted, exhibiting a negative elastic constant and acting as a total wave reflector within a range of frequencies, as shown in FIG. 16.

One advantage of Oceanit's metamaterial approach is that the smart proppant transmits acoustic signals at some frequencies and reflects them at others. This allows mapping of geological formation features around the fractures at one frequency and the proppant location and fracture mechanics at another. This information can be combined with microseismic data to further evaluate proppant placement within and among fractures.

FIG. 17 shows examples of microseismic fracture maps 200, 202.

FIG. 18 shows an experimental setup and a unit cell model and simulated impedance tube for determining smart proppant acoustic response.

FIG. 19 shows smart proppant 400 displacement and acoustic pressures at non-resonance frequencies (top) and at the local resonance frequency (bottom), indicating core activation and total reflection. At the right, reflection coefficient is shown as a function of frequency, demonstrating increase in reflection from close to zero to nearly one.

FIG. 20 shows Von Mises stress in an array of smart proppant particles at the local resonance frequency, indicating local stress at the interface of the matrix and core.

FIG. 21 shows transmission ratio as a function of frequency for 0.5 mm diameter particles for a 10 particle deep array. This corresponds to a 30 dB loss from a source of 90 dB.

FIG. 22 shows the effect of lattice depth on reflection coefficient for smart proppant and the reflection coefficient for a mixture of smart proppant and traditional proppant (dotted line). The mixture showed the same acoustic reflection response as smart proppant alone, while traditional proppant alone did not show a local resonance response (not shown).

FIG. 23 shows transient pulse analysis of unit cell array model demonstrating local resonance and reflection with a pulse at the local resonance frequency (top) and propagation and transmission at other frequencies (bottom).

The MetaFrac smart proppant exhibits a stress-dependent acoustic response due to the non-linear mechanical nature of surface contact between the spherical particles. Frequency changes in reflected signals result from Doppler shifts due to fluid flow through the particles in the fracture. Therefore, in addition to use of time-delay for localization, information on amplitude and frequency response can be used to map local mechanical environment.

While the invention has been described with reference to specific embodiments, modifications and variations of the invention may be constructed without departing from the scope of the invention, which is defined in the following claims.

We claim:

1. Apparatus comprising acoustic metamaterials configured for exhibiting acoustic bandgap behavior and configured for use in faults or fractures for altering acoustic transmission and reflection characteristics, wherein the acoustic metamaterials further comprises multilayer or composite particles comprising solid cores, stiff outer layers and elastic middle layers, wherein density of the solid cores is greater than density of the elastic middle layers, and adapted for exhibiting a local resonance at acoustic wavelengths, wherein the acoustic metamaterials comprise a stiff open porous foam coated and backfilled with materials having an elastic modulus different from the elastic modulus of the stiff open porous foam.

2. The apparatus of claim 1, wherein the acoustic metamaterials preclude acoustic frequencies of the metamaterials from being transmitted and act as wave reflectors or absorbers.

3. The apparatus of claim 1, wherein the acoustic metamaterials are disposed as proppants in a proppant array.

4. The apparatus of claim 1, wherein the acoustic metamaterials are mixed and packed with conventional proppants.

5. A method of locating and mapping of wells, faults, and fractures comprising:
altering acoustic transmission and reflection characteristics of wells, faults and fractures comprising the steps of:
providing acoustic particle metamaterial proppants,
mixing the acoustic particle metamaterial proppants,
providing particle cores in the metamaterial proppants,
providing flexible spacers around the cores encapsulating the particle cores,
providing outer shells around the spacers encapsulating the spacers, wherein density of the particle cores is greater than density of the flexible spacers,
mixing the acoustic particle metamaterials with well fluids, providing the acoustic particle metamaterial proppants in wells, faults and fractures, and
scanning and measuring acoustic transmission and reflection characteristics of the acoustic particle metamaterial proppants and mapping wells, faults and fractures
wherein the acoustic metamaterials comprise a stiff open porous foam coated and backfilled with materials having an elastic modulus different from the elastic modulus of the stiff open porous foam.

6. The method of claim 5, further comprising mixing and packing the acoustic particle metamaterial proppants with conventional proppants and using the mixed proppants in wells, faults and fractures.

7. The method of claim 6, wherein the mixed proppants are mixed with hydraulic fracturing materials and pumped into wells, wherein the mixed proppants maintain wells, fractures and faults open, and whereupon acoustic frequencies from emitters arriving at the acoustic particle metamaterials provide reflected wave frequencies in response to the arriving frequencies, and wherein detectors receive the reflected frequencies at distinctive times for determining location of the proppants in the wells, faults and fractures.

* * * * *